Nov. 14, 1939.  R. H. OSTERLOH ET AL  2,180,119
ADSORBER APPARATUS
Filed April 16, 1938
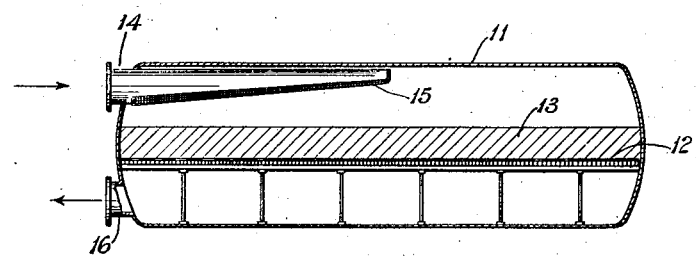
Fig. 1
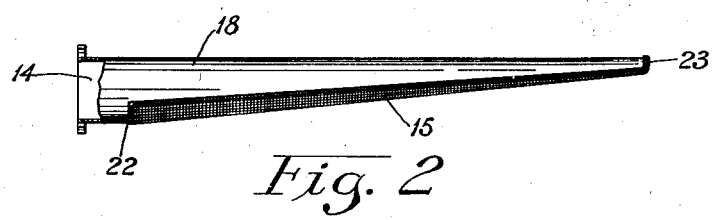
Fig. 2
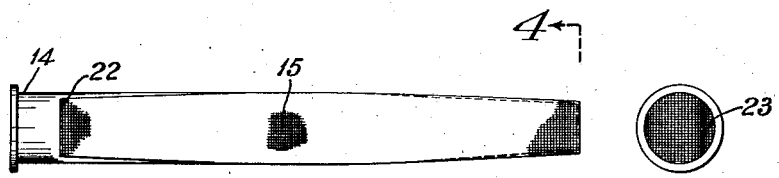 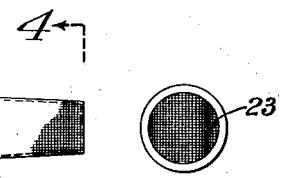
Fig. 3  Fig. 4
Robert H. Osterloh &
William L. Scarborough
INVENTORS
BY
ATTORNEY.

Patented Nov. 14, 1939

2,180,119

UNITED STATES PATENT OFFICE 2,180,119

ADSORBER APPARATUS

Robert H. Osterloh, Wilmington, Del., and William L. Scarborough, Waynesboro, Va., assignors to E. I. du Pont de Nemours & Company, Wilmington, Del., a corporation of Delaware Application April 16, 1938, Serial No. 202,432

2 Claims. (Cl. 183—4)

This invention relates to apparatus for the uniform distribution of the incoming gases or vapors in adsorber units which contain extended beds of adsorbent material. More particularly, the invention deals with apparatus for the uniform distribution of gases containing volatile solvents which are passed into adsorber units in solvent recovery apparatus employing solid adsorbing media.

It is well known in the art to employ a solid adsorbing medium such as activated charcoal in an enclosed adsorber unit for separating the constituents of a gaseous mixture. Such apparatus is particularly useful when it is desired to separate one or more constituents present in very small concentration, from a gaseous mixture, the bulk of which is an inert gas. One field in which such an apparatus finds application is that of solvent recovery in processes where lacquers, coatings such as for artificial leather, adhesives, etc., are deposited from solutions of volatile solvents. Such solutions of lacquers, etc., are frequently deposited upon webs or other structures by means of dipping, spraying, transfer rolls, etc., and then the webs or other objects are subjected to blasts of air with or without heating in suitable chambers so that the volatile solvents are completely driven off. When such solvents have a very low vapor pressure at the temperatures of operation or when they are combustible and hence, form explosive mixtures with air, it is desirable and often necessary to use large quantities of air in the drying operation so as to obtain a gas mixture in which the volatile solvents have a very low concentration.

In the interest of economy, as well as the avoidance of pollution of the atmosphere, it is desirable to obtain these volatile constituents from the air used in the drying operation. One highly efficient method of separating these constituents from the air consists in placing the gas mixture in contact with certain solid materials which will actively adsorb the solvent constituent. Many forms of activated adsorbent material are available, such as for instance, activated charcoals, silica gel, etc., and many forms of apparatus are available in which these solid materials are maintained in porous beds through which the gaseous mixtures are passed.

When very large volumes of gas containing low concentrations of solvent material are passed through such adsorbent beds, it has been found that the high velocities of the gaseous mixture tend to disturb the bed of adsorbent if this be in granular form, and the irregular distribution of gas flow thus produced through various portions of the bed will not give the highest efficiency of adsorption. When large volumes of gas are passed through a bed of adsorbent material, it has been found that the volume of the gas passing through various sections of the bed is non-uniform, so that some sections of the bed will be saturated before other sections.

It is, therefore, an object of this invention to provide apparatus which will give an optimum distribution of gas flow through adsorber units to protect the physical condition of the bed and to give a maximum of adsorption by said adsorber unit.

Other objects of the invention will appear hereinafter.

The details of the invention will be more clearly apparent by reference to the following description taken in connection with the accompanying illustration showing one specific embodiment of the invention and in which;

Figure 1 shows, in section and side elevation, an adsorber of the horizontal type containing an air distributor constructed in accordance with the invention.

Figure 2 is an enlarged side elevational view of the air distributor shown in Figure 1.

Figure 3 is the bottom plan view of Figure 2.

Figure 4 is an end view of Figure 3.

Figure 1 of the drawing illustrates a horizontal type adsorber provided with a gas distributing device for uniformly distributing the gases over the surface of the adsorbent bed. The adsorber comprises a horizontal cylindrical shell 11 forming a complete enclosure except for inlet and outlet openings. The shell 11 is provided with a perforated shelf 12 which completely divides the interior of this cylinder into upper and lower sections. A bed of porous granular carbon 13 rests upon the perforated shelf 12 and is so distributed over the surface of the perforated shelf that it completely covers the area bounded by the walls and ends of the cylinder at the position of the shelf to a uniform depth of approximately two feet. A gaseous mixture comprising, for example, an inert gas and a solvent vapor is passed into the shell through the flanged opening of the distributing member 14. The gases may be moved to and through the adsorber from any source by means of a suitable system of ducts and blowers (not shown) in a known manner. The gases enter the upper section of the adsorber housing through the openings in the screen 15. The screen 15 is designed to provide an even distribution of the gases both as to volume and velocity over the entire upper surface of the carbon bed 13. They pass through the carbon bed, therefore, with an even distribution so that each section of the carbon bed will treat approximately equal volumes of gaseous mixture. Upon issuing from the carbon bed through the perforations of the shelf 12, the inert gas from which substantially all the solvent vapor has been removed enters the lower section of the adsorber housing 11 and makes its exit through outlet opening 16.

The gas distributor which is shown in greater detail in Figures 2, 3, and 4 comprises a conduit 18 cut at such an upwardly directed angle to its longitudinal center line as to present an open surface having an area of at least 5 times the cross-sectional area of the inlet conduit. The opening cut in the conduit 18 faces the bed of adsorbent material, and is preferably covered with a perforated element such as a screen to break up the gases and pass them at a substantially uniform velocity from all parts of said opening.

In its preferred construction, the conduit 18 has a length approximately 9 times its diameter. A distributor which is approximately 2 feet in diameter and 18 feet long will be suitable for use with a horizontal cylindrical adsorber shell 10 feet in diameter and 30 feet long. This specific form of distributor is preferably constructed as follows:

A transverse cut is made at 22 into the bottom side of the conduit. This transverse cut is made at about 18 inches from the flanged opening and has a depth of about ¼ the diameter of the pipe, or about 6 inches. A cut will now be made from the extreme projecting end 23 of the conduit 18. This latter cut will be made from the inner end of the transverse cut at 22 along an upwardly directed intersecting plane which will bisect the end 23 along a horizontal line which is approximately 6 inches, or approximately ¼ the diameter of the conduit, below the top surface. Such a cut will make an angle with the center line of the conduit of about 3½°.

In the case of the usual solvent recovery systems of this type, the opening which results from cutting out the portion described in the previous paragraph is covered over with copper screening of a mesh and wire size such that the velocity of the gases passing through various sections of the screen will be substantially uniform. This screening is formed around the opening so that it conforms to the circumference of the pipe at the end adjacent the inlet opening, and becomes more and more flattened out as it approaches the extreme projecting end. A flap of screening covers the truncated latter end. The entire periphery of the screening is securely fastened to the cylinder by means of brazing, silver soldering, or other suitable method which will result in maintaining a secure bond at the temperatures of operation and which will be immune to corrosion where this is a factor.

It may be desired to use two, three, four or more thicknesses of screen over the opening in the distributor to obtain the desired resistance to the flow of gases.

The choice of materials for the construction of the air distributor will depend mainly upon the conditions to be met in the adsorption process, and should be selected so as to give suitable strength and resistance to corrosion. The tube or cylindrical part of the distributor may be constructed of steel, but for certain purposes brass may be found suitable, or if highly corrosive gases are to be handled, it may be preferable to construct this element of copper, stainless steel or other corrosion-resistant material. Similarly, the screening may be made of various materials depending upon the corrosion resistance and other properties desired. Preferably the tubing and screening are constructed of the same material to prevent the forming of an electro-couple and the attendant rapid preferential corrosion.

The use of the air distributor of the instant invention provides a highly uniform and satisfactory distribution of gases through a granular carbon or other adsorbent bed of the type described. By its use, the bed of adsorbent material can be maintained over long periods of time in an undisturbed state. Furthermore, the use of such a distributing device results in a maximum adsorption of adsorbable components of the gas mixture for a given bed of adsorbent material and also in a maximum rate of adsorption so that the adsorbent system may be used with a higher efficency and with greater gas flows than has been possible heretofore.

Obviously, many changes and modifications can be made in the details of construction above described without departing from the nature and spirit of the invention. It is, therefore, to be understood that the invention is not to be limited except as set forth in the appended claims.

We claim:

1. An adsorber unit in which the diameter is approximately one-third of the horizontal length, said adsorber containing a horizontal bed of adsorbent material and inlet and outlet means for gases all so arranged that gases passing through the adsorber unit pass successively through the inlet, down through the bed of adsorbent material and the outlet, said inlet means provided with a gas distributor comprising a substantially tubular horizontal conduit extending over said bed of adsorbent material which is approximately one-half the length of the adsorber housing, said distributor having an opening at the bottom thereof, said opening extending at an upwardly directed angle toward the extreme inwardly directed end of the conduit and having an area of at least five times the cross-sectional area of the inlet conduit, and a screen positioned over said opening, the mesh of said screen being sufficiently small to break up said gases and cause the same to pass from the conduit at a substantially uniform velocity from all parts of said opening.

2. An adsorber unit as defined in claim 1 in which the opening in the distributor extends from a transverse cut near the inlet opening along an upwardly directed intersecting plane which intersects the extreme inwardly directed end of the conduit along a horizontal line drawn approximately one-fourth the diameter below the top surface of said conduit.

ROBERT H. OSTERLOH.
WILLIAM L. SCARBOROUGH.